United States Patent [19]
Masten et al.

[11] Patent Number: 5,896,487
[45] Date of Patent: Apr. 20, 1999

[54] OPTO-ELECTRICALLY CONTROLLED DIRECT CURRENT MOTOR SPEED CONTROL CIRCUIT

[76] Inventors: Billy Reese Masten, P.O. Box 610, Shallowater, Tex. 79363; Darrell Vines, 3103 25 St., Lubbock, Tex. 79707

[*] Notice: This patent issued on a continued prosecution application filed under 37 CFR 1.53(d), and is subject to the twenty year patent term provisions of 35 U.S.C. 154(a)(2).

[21] Appl. No.: 08/611,399

[22] Filed: Mar. 5, 1996

[51] Int. Cl.$^6$ .................................................. H02P 5/178
[52] U.S. Cl. ........................... 388/811; 318/254; 388/934
[58] Field of Search ............................... 388/800–808, 388/907.5, 909, 811, 934, 819; 318/254, 439, 138; 324/160, 175; 73/494, 497; 250/227.21, 231.1, 231.13, 231.14, 231.16, 231.17, 231.18, 233, 236

[56] References Cited

U.S. PATENT DOCUMENTS

| | | |
|---|---|---|
| 3,317,804 | 5/1967 | Baker et al. . |
| 3,366,862 | 1/1968 | Beck et al. . |
| 3,383,518 | 5/1968 | Copland et al. . |
| 3,641,413 | 2/1972 | Ohntrup et al. . |
| 3,708,681 | 1/1973 | Ivers ........................ 250/231 |
| 3,891,902 | 6/1975 | Konrad . |
| 4,191,914 | 3/1980 | Lecluse . |
| 4,310,788 | 1/1982 | Hanyu et al. . |
| 4,351,405 | 9/1982 | Fields et al. . |
| 4,399,393 | 8/1983 | Santini . |
| 4,459,523 | 7/1984 | Evans et al. . |
| 4,460,857 | 7/1984 | Michaelis ..................... 318/375 |
| 4,471,276 | 9/1984 | Cudlitz . |
| 4,544,868 | 10/1985 | Murty ........................ 318/254 |
| 4,604,575 | 8/1986 | Shimizu et al. ................ 324/207.18 |
| 4,775,945 | 10/1988 | Cavill et al. .................. 395/105 |
| 4,789,874 | 12/1988 | Majette et al. ................. 347/37 |
| 4,814,631 | 3/1989 | Jackson . |
| 4,866,356 | 9/1989 | Altendorf . |
| 4,970,380 | 11/1990 | Miller ......................... 250/205 |
| 5,023,529 | 6/1991 | Tennant ........................ 318/266 |
| 5,049,735 | 9/1991 | Kitajima et al. . |
| 5,079,487 | 1/1992 | Malang ........................ 318/254 |
| 5,105,133 | 4/1992 | Yang . |
| 5,148,019 | 9/1992 | Kobayashi et al. . |
| 5,208,519 | 5/1993 | Dykstra et al. . |
| 5,229,597 | 7/1993 | Fukatsu . |
| 5,233,277 | 8/1993 | Kasig et al. . |
| 5,237,391 | 8/1993 | Huggins ...................... 250/237 |
| 5,317,669 | 5/1994 | Anderson et al. . |
| 5,319,291 | 6/1994 | Ramirez ...................... 318/254 |
| 5,331,258 | 7/1994 | Lankin et al. . |
| 5,332,954 | 7/1994 | Lankin . |
| 5,388,176 | 2/1995 | Dykstra et al. . |
| 5,448,055 | 9/1995 | Nakamura et al. . |
| 5,452,109 | 9/1995 | Compton . |
| 5,461,293 | 10/1995 | Rozman et al. ................ 318/603 |

*Primary Examiner*—Jonathan Wysocki
*Attorney, Agent, or Firm*—Haynes and Boone, LLP

[57] ABSTRACT

A dc motor speed control circuit is provided. A first circuit utilizing an opto-electric sensor for providing an input signal corresponding to a desired dc motor speed is connected to a second circuit and the second circuit is connected to the dc motor, wherein the second circuit responds to the input signal and causes current to flow through the dc motor corresponding to the input signal. A temperature circuit, voltage level circuit and current level circuit may also be connected to the second circuit to control the dc motor.

22 Claims, 4 Drawing Sheets

5,896,487

OPTO-ELECTRICALLY CONTROLLED DIRECT CURRENT MOTOR SPEED CONTROL CIRCUIT

BACKGROUND OF THE INVENTION

The present invention relates to the control of motors and, more particularly, to a simplified circuit for the control of a direct current (dc) motor using opto-electric sensing.

DC motors are designed and used in a variety of applications, such as golf carts and fork lifts to name a few. Various techniques or systems have been utilized to control the speed and operation of direct current motors. However, these techniques or systems have generally involved complex electrical circuitry which is not only space intensive but also relatively expensive to manufacture. As the use of dc motors, and the vehicles they power, has become ever more pervasive, there has become a great need for a reduction in the space and cost of the control circuitry.

Therefore, what is needed is a simplified circuit for the control of a direct current motor.

SUMMARY OF THE INVENTION

The present invention, accordingly, provides a simplified circuit for the control of a dc motor. To this end, a dc motor speed control which has a first circuit utilizing an opto-electric sensor for providing an input signal to a connected second circuit is provided. The second circuit is connected to the dc motor, wherein the input signal indicates a desired speed of the dc motor and the second circuit causes current to flow through the dc motor corresponding to the speed indicated by the input.

In one embodiment of the invention, the opto-electric sensor comprises a light emitting diode and a light sensor, with a moveable transmissive film interposed between the light emitting diode and the light sensor.

In another embodiment of the invention, the opto-electric sensor circuit comprises a light emitting diode and a line imager, with a moveable opaque film interposed between the light emitting diode and the line imager.

A temperature circuit may be connected to the second circuit to monitor the circuit's temperature. When the temperature exceeds a predetermined level, current is prohibited from flowing through the dc motor until the temperature has fallen.

A voltage level circuit may be connected to the second circuit to monitor the voltage level of the battery supplying the dc motor. When the voltage falls below a predetermined minimum level, current is prohibited from flowing through the dc motor until the voltage level is restored.

A current level circuit may also be connected to the second circuit to monitor the current flowing through the dc motor. When the current exceeds a predetermined maximum level, current is prohibited from flowing through the dc motor.

DESCRIPTION OF THE PREFERRED EMBODIMENTS

Figure 1:
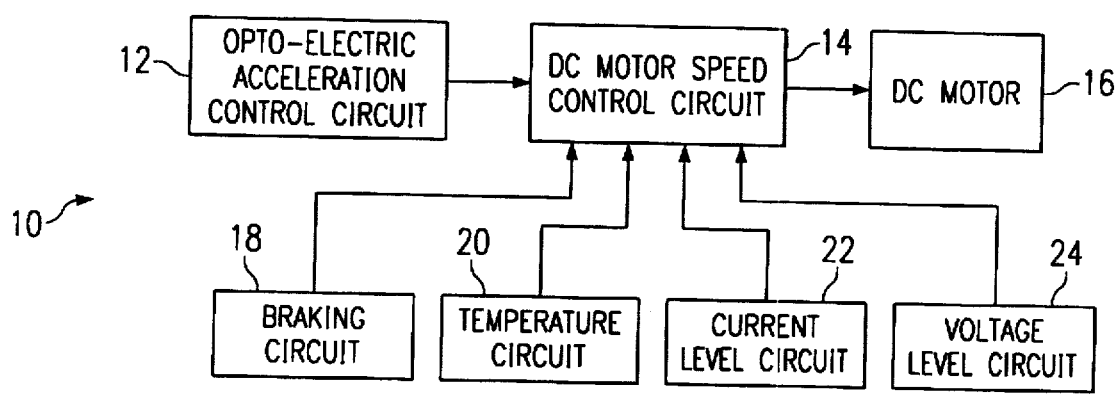
FIG. 1 is a block diagram of the dc motor control circuit of the present invention.

FIG. 1 is a block diagram of the dc motor control circuit 10 of the present invention. The control circuit 10 comprises an opto-electric control circuit, or opto-electric sensor, 12 connected to a dc motor speed control circuit 14. The dc motor speed control circuit 14 is connected to a dc motor 16. The control circuit 10 may, optionally, contain a braking circuit 18, a temperature circuit 20, a current level circuit 22 and/or a voltage level circuit 24, which are all connected to the speed control circuit 14.

Figure 2A:
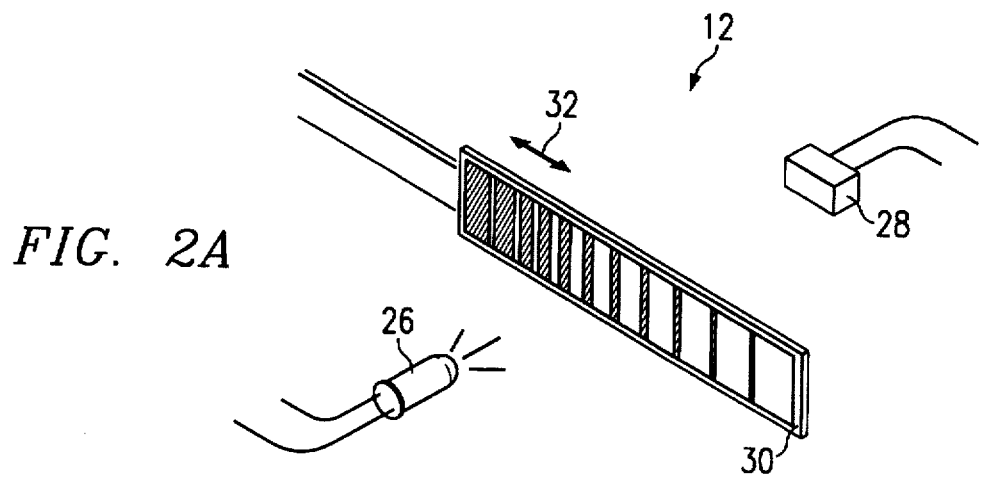
FIG. 2A is a perspective view of one embodiment of an opto-electrical sensor used in accordance with the present invention.
Figure 2B:
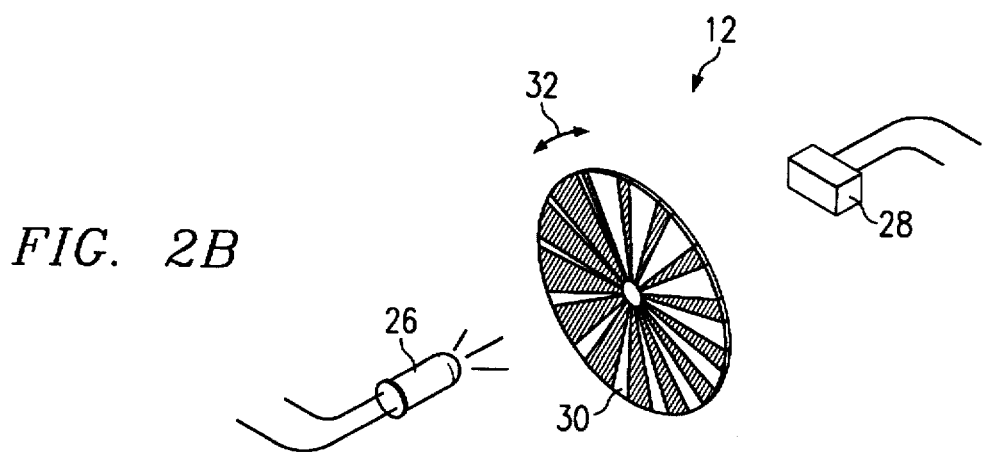
FIG. 2B is a perspective view of a second embodiment of an opto-electrical sensor used in accordance with the present invention.
Figure 2C:
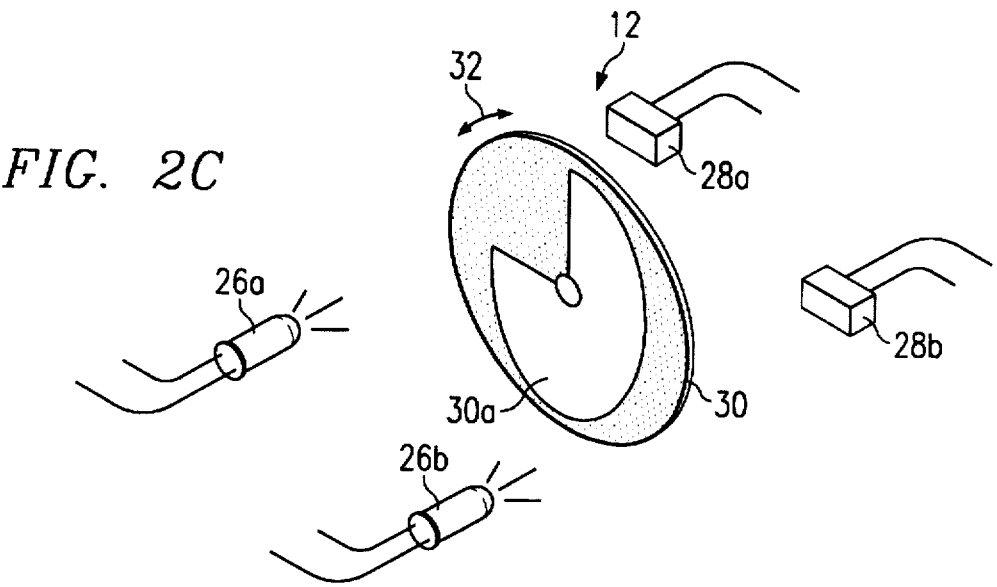
FIG. 2C is a perspective view of a third embodiment of an opto-electrical sensor used in accordance with the present invention.

FIGS. 2A–E are alternative embodiments of the opto-electric control circuit 12 shown in FIG. 1. Similar elements in FIGS. 2A–E have been given identical numbers for ease of reference. The embodiment shown in FIG. 2A comprises a light emitting diode (LED) 26 and a light sensor 28 with a linear moveable transmissive film 30 interposed between the LED 26 and the light sensor 28. The light sensor 28 in the embodiments shown in FIGS. 2A–2C is a TSL235 light to frequency converter manufactured by Texas Instruments, Dallas, Tex., which outputs a fifty percent (50%) duty cycle square wave whose frequency is directly proportional to the light intensity. The transmissive film 30 varies in transmissivity from 100% to 0% over its length such that as it is moved back and forth along line 32 varying amounts of light from the LED 26 strike the light sensor 28 for a purpose to be described.

The embodiment shown in FIG. 2B is similar to the embodiment shown in FIG. 2A, except that an angular moveable transmissive film 30 is interposed between the LED 26 and the light sensor 28. The transmissive film 30 varies in transmissivity from 100% to 0% around its circumference such that as it is moved around arc 32 varying amounts of light from the LED 26 strike the light sensor 28.

The embodiment shown in FIG. 2C is similar to the embodiment shown in FIG. 2B, except that two LEDs 26a and 26b and two light sensors 28a and 28b are utilized, with an angular moveable transmissive film 30 interposed between the LEDs 26a, 26b and the light sensors 28a, 28b. The transmissive film 30 has, as shown, a ¾ oval transmissive region 30a in an otherwise opaque disc such that as it is moved around arc 32 different amounts of light from the LEDs 26a, 26b pass through the transmissive film 30, depending upon the location of the transmissive region 30a, and strike, respectively, the light sensor 28a, 28b.

Figure 2D:
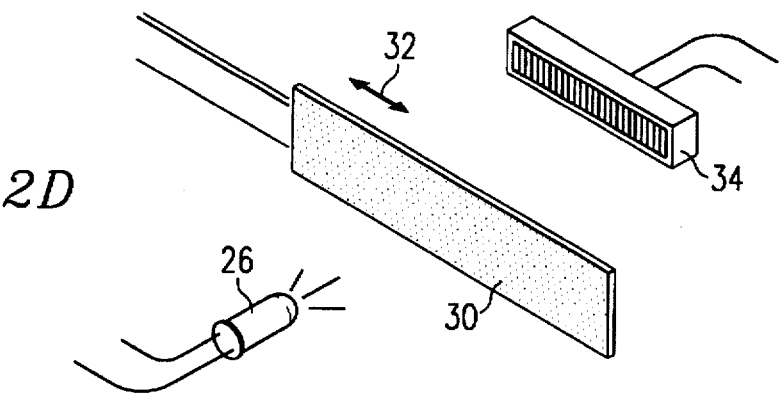
FIG. 2D is a perspective view of a fourth embodiment of an opto-electrical sensor used in accordance with the present invention.
Figure 2E:
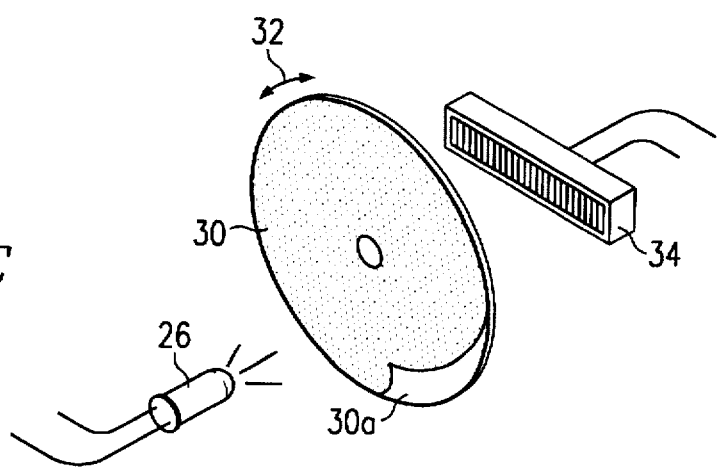
FIG. 2E is a perspective view of a fifth embodiment of an opto-electrical sensor used in accordance with the present invention.

The embodiment shown in FIG. 2D comprises an LED 26 and a line imager 34 with a linear moveable opaque film 30 interposed between the LED 26 and the line imager 34. The line imager 34 in the embodiments shown in FIGS. 2D–2E is a TSL214 integrated opto sensor manufactured by Texas Instruments, Dallas, Tex., which comprises 64 charge-mode pixels arranged in a 64×1 linear array which, upon the application of a clock signal and other control signals, sequentially steps through each pixel and outputs an active signal for each corresponding pixel which is then illuminated. It is understood that the line imager 34 may consist of a number of serial or parallel connected TSL214 integrated opto sensors. As the opaque film 30 is moved along line 32 a greater number of pixels in the line imager 34 are illuminated by light from the LED 26 which causes the duty cycle of the output to vary based on the number of illuminated pixels.

The embodiment shown in FIG. 2E is similar to that shown in FIG. 2D, except that an angular moveable transmissive film 30 is interposed between the LED 26 and the line imager 34. The transmissive film 30 has a unique arced transmissive region 30a near a part of its circumference in an otherwise opaque disc such that as it is moved around arc 32 a greater number of pixels in the line imager 34 are illuminated by light from the LED 26. The arced transmissive region 30a essentially translates rotational movement of the transmissive film 30 into a linear movement of the transmissive region along the line imager 34.

Figure 3A:
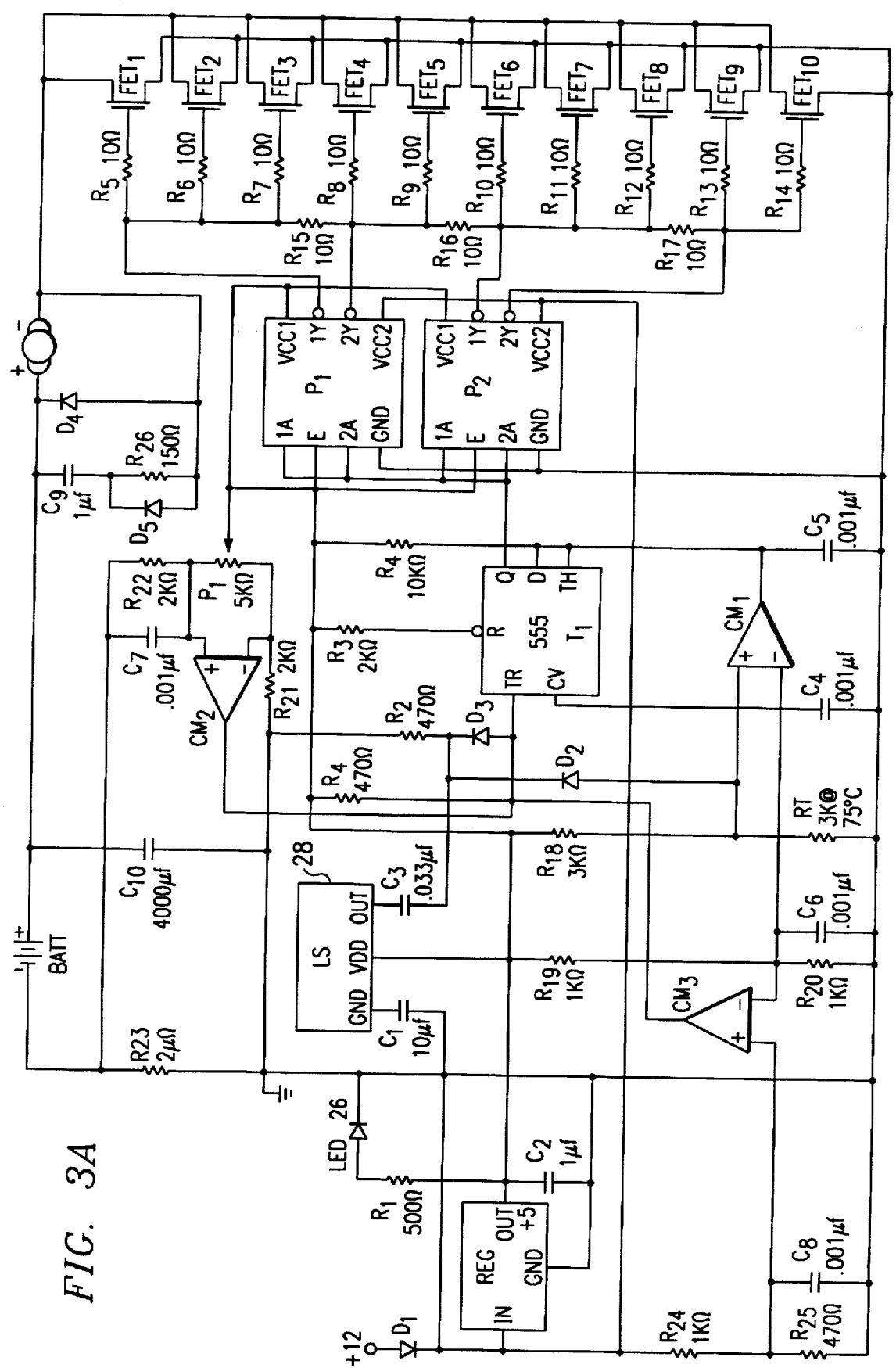
FIG. 3A is a detailed schematic diagram of one embodiment of the dc motor control circuit of the present invention.

Referring now to FIG. 3A, a schematic diagram is shown of the control circuit 10 capable of utilizing the opto-electric control circuit 12 embodiments shown in FIGS. 2A and 2B. The control circuit 10, although not shown as such in FIG. 3A, comprises the opto-electric control circuit 12, speed control circuit 14, dc motor 16, temperature circuit 20, current level circuit 22 and voltage level circuit 24. The components comprising each of these elements will be described later.

As shown in FIG. 3A, power is supplied to the control circuit 10 by a voltage regulator REG which steps down the voltage at its input to a +5 output voltage, relative to its ground output (the voltage regulator's REG ground output will, hereinafter, be referred to as "signal ground"). A protection diode $D_1$ is connected between +12 volts and the input of the voltage regulator REG with the diode's $D_1$ anode connected to +12 volts and its cathode connected to the input of the voltage regulator REG. A first capacitor $C_1$ is connected between the voltage regulator's REG input and signal ground and a second capacitor $C_2$ is connected between the voltage regulator's output and signal ground.

The opto-electric control circuit 12 is comprised of resistors $R_1$ and $R_2$, a capacitor $C_3$, diodes $D_2$ and $D_3$, the LED 26, and the light sensor 28. The resistor $R_1$ is connected in series with the LED 26 between the output of the voltage regulator REG and signal ground. The light sensor 28 has its ground pin connected to signal ground and its VDD pin connected to the output of the voltage regulator REG. The output of the light sensor 28 is connected to the capacitor $C_3$. The capacitor $C_3$ is then connected to the cathodes of diode $D_2$ and $D_3$ and to the resistor $R_2$. The resistor $R_2$ is connected to signal ground. The connection of the anodes of diode $D_2$ and $D_3$ will be describe later.

The speed control circuit 14 comprises a 555 timer $T_1$, capacitors $C_4$–$C_5$, Resistors $R_3$–$R_4$ two MOSFET power drivers $P_1$ and $P_2$, and ten field effect transistors $FET_{1-10}$. The trigger of the timer $T_1$ is connected to the anode of the diode D3. The control voltage input of the 555 timer $T_1$ is connected to signal ground through the capacitor $C_4$ and the reset input of the 555 timer $T_1$ is pulled up to the output of the regulator REG through the resistor $R_3$. The discharge and threshold inputs of the 555 timer $T_1$ are connected between the series connected resistor $R_4$ and capacitor $C_5$, the capacitor $C_5$ being connected to ground and the resistor 14 being connected to the output of the regulator REG.

The output of the 555 timer $T_1$ is connected to the inputs of the MOSFET power drivers $P_1$ and $P_2$. The inverted outputs of the MOSFET power drivers $P_1$ and $P_2$ are connected to the bases of the transistors $FET_1$–$FET_{10}$ through resistors $R_5$–$R_7$. The drains of the transistors $FET_1$–$FET_{10}$ are connected to the negative terminal of the dc motor 16, and the sources of $FET_1$–$FET_{10}$ are connected to signal ground.

The temperature circuit 20 is comprised of a thermistor $R_T$, resistors $R_{18}$–$R_{20}$, a capacitor $C_6$ and a comparator $CM_1$. The resistor $R_{18}$ and the thermistor $R_T$ are connected in series between the output of the voltage regulator REG and signal ground to form a voltage divider. Similarly, the resistors $R_{19}$ and $R_{20}$ are connected in series between the output of the voltage regulator REG and signal ground to form a second voltage divider. The center of the $R_{18}$–$R_T$ voltage divider is connected to the positive input of the comparator $CM_2$, and the negative input of the comparator $CM_1$ is connected to the center of the $R_{19}$–$R_{20}$ voltage divider. The positive input of the comparator $CM_1$ is also connected to the anode of diode $D_2$. Capacitor $C_6$ is also connected between the negative input of comparator $CM_1$ and signal ground. The output of the comparator $CM_1$ is connected to the discharge and threshold inputs of the 555 timer $T_1$.

The current level circuit 22 is comprised of a comparator $CM_2$, resistors $R_{21}$–$R_{23}$, potentiometer $P_1$, and a capacitor $C_7$. The resistor $R_{23}$ is connected between signal ground and the negative terminal of a battery BAT. The negative terminal of the battery BAT is connected to the positive input of the comparator $CM_2$ through the parallel combination of capacitor $C_7$ and resistor $R_{22}$. The positive input of the comparator $CM_2$ is also connected to the output of the voltage regulator REG through the potentiometer $P_1$. The negative input of the comparator $CM_2$ is connected to the middle of a voltage divider created by the potentiometer $P_1$ and the resistor $R_{21}$, between the output of the voltage regulator REG and signal ground. The output of the comparator $CM_2$ is then connected to the trigger input of the 555 timer $T_1$.

The voltage level circuit 24 is comprised of resistors $R_{24}$ and $R_{25}$, capacitor $C_8$ and comparator $CM_3$. The resistors $R_{24}$ and $R_{25}$ are connected in series between the cathode of diode $D_1$ and signal ground to form a voltage divider. The center of the $R_{24}$–$R_{25}$ voltage divider is connected to the positive input of the comparator $CM_3$. The positive input of the comparator $CM_3$ is also connected to signal ground through the capacitor $C_8$. The negative input of the comparator $CM_3$ is connected to the center of the $R_{19}$–$R_{20}$ voltage divider. The output of the comparator $CM_3$ is then connected to the trigger input of the 555 timer $T_1$.

Finally, protection circuitry is included in the control circuit 10. The protection circuitry comprises diodes $D_{4-5}$, resistor $R_{26}$, and capacitors $C_{9-10}$. The diode $D_4$ is connected with its cathode connected to the positive terminal of the dc motor 16, and its anode is connected to the negative terminal of the dc motor 16. The capacitor $C_9$ is connected to the positive terminal of the dc motor 16 and to the parallel combination of the resistor $R_{26}$ and the diode $D_5$. The anode of the diode $D_5$ being connected to the negative terminal of the dc motor 16. The capacitor $C_{10}$ is connected between the positive and negative terminals of the battery BAT.

The operation of the control circuit 10 shown in FIG. 3A will now be described. Although not shown in FIG. 3A, it is understood that a transmissive film 30, such as those shown in FIGS. 2A and 2B, is placed between the LED 26 and the light sensor 28 such that as the transmissive film 30 is moved, varying amounts of light are detected by the light sensor 28. The actual amount of light sensed by the light sensor 28 corresponds to the desired speed of the dc motor 16, in this embodiment more light results in lower speeds. In normal operation, the output of the light sensor 28 is a constant duty cycle square wave with a frequency dependent upon the amount of light sensed. On each negative going edge of the light sensor 28 output, the negative edge is passed through to the trigger input of the 555 timer through the capacitor $C_3$, resistor $R_2$ and diode $D_3$. This causes the output of the 555 timer $T_1$ to go high which, turns off the transistors $FET-FET_{10}$ and stops current from flowing through the dc motor 16.

The 555 timer $T_1$ is designed to automatically generate a low output according to the charging time constant of the resistor $R_4$ and capacitor $C_5$. When the capacitor $C_5$ reaches the appropriate threshold value it automatically causes the output of the 555 timer $T_1$ to go low, which brings the discharge input low causing the charge on the capacitor $C_5$ to discharge, starting a new charging cycle. In the embodiment shown, the charging time of the capacitor $C_5$ is approximately 25 micro-seconds. When the output of the 555 timer $T_1$ cycles low, the transistors $FET_1-FET_{10}$ are turned on, thus causing current to flow in the dc motor 16.

In order to assure that the on and off time periods of the transistors $FET_1-FET_{10}$ are synchronized to the falling edges of the light sensor 28, the timing of the light sensor 28 falling edges must be synchronized to the $C_5-R_4$ time constant. Otherwise, the 555 timer $T_1$ could inadvertently reset and cause the motor 16 to turn on. Accordingly, the falling edge of the light sensor 28 output is also passed to the positive input of the comparator $CM_1$. In normal operation, the output of $CM_1$ is held at an open collector high level, thus permitting $C_5$ to charge through $R_4$. However, when the positive input of comparator $CM_1$ falls momentarily low, by the application of the negative edge of the light sensor 28 output, all charge on capacitor $C_5$ is discharged. Then, the positive input of comparator $CM_1$ returns to a high state and capacitor $C_5$ is allowed to begin a charging cycle. Accordingly, as soon as the light sensor 28 causes the trigger input of the 555 timer $T_1$ to fall low, the $C_5-R_4$ timing circuit is also reset. This assures that the $C_5-R_4$ timing circuit will always cause the 555 timer $T_1$ to reset a given time period after the light sensor 28 generates a negative edge at its output.

Accordingly, if the frequency of the light sensor 28 output is greater than the $C_5-R_4$ time constant, then the transistors $FET_{1-10}$ will remain off. However, as the frequency of the light sensor 28 output decreases, such that its period is greater than the $C_5-R_4$ time constant, the motor will be turned on periodically for the amount of time the period of the light sensor 28 output is greater than the $C_5-R_4$ time constant.

In certain circumstances, excessive current may flow through the transistors $FET_{1-10}$, and the motor 16, which can cause damage to both the transistors $FET_{1-10}$ and the motor 16. Accordingly, when the motor 16 is on, current flows from signal ground through the resistor $R_{23}$ to the negative terminal of the battery BAT. As the current increases through $R_{23}$, the voltage level at the positive input of the comparator $CM_2$ begins to fall. When the voltage level at the positive input of the comparator $CM_2$ falls below the voltage at the negative input of the comparator $CM_2$, the output of $CM_2$ goes low which pulls the trigger input of the 555 timer $T_1$ low and causes the output of the 555 timer $T_1$ go high, thus stopping current from flowing in the motor 16. The motor 16 remains off until the current through the resistor $R_{23}$ falls adequately to bring the voltage at the positive input of the comparator $CM_2$ above t negative input voltage. It is understood that the potentiometer $P_1$ can be adjusted to vary the current required through resistor $R_{23}$ to stop current from flowing in the motor 16.

In certain circumstances the current passing through transistors $FET_{1-10}$ can cause the temperature of the transistors $FET_{1-10}$ to exceed acceptable levels. Accordingly, the thermistor $R_T$ is placed near the transistors $FET_{1-10}$. As the temperature increases, the resistance of the thermistor $R_T$ falls, causing the voltage at the positive input of the comparator $CM_1$ to fall. When the voltage at the positive terminal of the comparator $CM_1$, falls below the voltage at the negative terminal of the comparator $CM_1$, the output of the comparator $CM_1$ falls low, discharging the voltage on the capacitor $C_5$. With the output of comparator $CM_1$ low, the 555 timer $T_1$ is unable to generate a low output and turn on the transistors $FET_{1-10}$. This condition is maintained until the temperature falls sufficiently that the thermistor's $R_T$ resistance has increased to pull the voltage at the positive input of the comparator $CM_1$ above the voltage at the negative input of the comparator $CM_2$. It is possible that the 555 timer $T_1$ could have a low output when the comparator $CM_1$ detects an excessive temperature. In this condition, the transistors $FET_{1-10}$ would remain on until the light sensor 28 generates a falling edge to the trigger of the 555 timer $T_1$. It is understood that the light sensor 28 is designed to continue to generate falling edges even when no light is sensed. In the embodiment shown, at 75 degrees Celsius the thermistor $R_T$ has the same resistance as resistor $R_{18}$, at this temperature, the voltage levels at the positive and negative inputs of the comparator $CM_1$ are equal.

In other circumstances battery BAT voltage can fall below an acceptable level which will necessitate shutting off the motor 16. Accordingly, the comparator $CM_3$ monitors the battery BAT voltage. The positive input of the comparator $CM_3$ is referenced to the voltage regulator REG input voltage, which is derived from the battery BAT in any conventional manner, through the $R_{24}-R_{25}$ voltage divider. The negative input of the comparator $CM_3$ is referenced to the output of the regulator REG through the $R_{19}-R_{20}$ voltage divider. It is understood that the regulator REG is able to maintain a constant output voltage over a broad range of input voltage. In normal operation, the output of the comparator $CM_3$ remains open-collector high. However, as the regulator REG input voltage begins to fall, the regulator REG output voltage remains constant. When the regulator REG input voltage falls below a predetermined value, the output of the comparator $CM_3$ falls low which pulls the trigger of the 555 Timer $T_1$ low, forcing the output high, which stops current from flowing in the motor 16. The motor 16 remains off until the voltage at the input to the regulator REG rises above the predetermined value.

The protection circuitry is designed to protect against damage which may be caused by reverse inductance from the motor 16. The diode $D_4$ is placed near the motor 16 and becomes forward biased, turning on, to allow current to flow through the motor 16 when the motor 16 begins to generate reverse inductance. While diode $D_4$ accounts for the motor's 16 reverse inductance, the leads to the motor 16 also generate a significant amount of inductance which cannot be accounted for by diode $D_4$. Accordingly, the capacitor $C_9$, resistor $R_{26}$ and diode $D_5$ circuit are placed near the transistors $FET_{1-10}$, to absorb the lead inductance. In the absence of reverse inductance, the capacitor $C_9$ is charged by the battery BAT through the resistor $R_{26}$. In the presence of reverse inductance from the leads, diode $D_5$ becomes forward biased, turning on, which discharges the voltage on the capacitor $C_9$ and dissipating the lead inductance.

While not shown, it is understood that the leads to the motor 16 should be designed to minimize their inductance. Accordingly, the present invention utilizes wide film conductors, rather than conventional wire leads, to minimize this inductance.

Although not shown, it is understood that the opto-electric control circuit 12 embodiment shown in FIG. 2C could be used in a manner similar to that described in connection with FIG. 3A. Using the opto-electric control circuit 12 embodiment shown in FIG. 2C would require two control circuits 10 shown in FIG. 3A. In this case one of the light sensors 28a, 28b would be used to control the armature current in the motor 16 and the other light sensor 28b, 28a, would be used to control the field current in the motor 16. By separately controlling the field and armature currents, greater control over the motor's 16 speed and torque can be created.

Figure 3B:
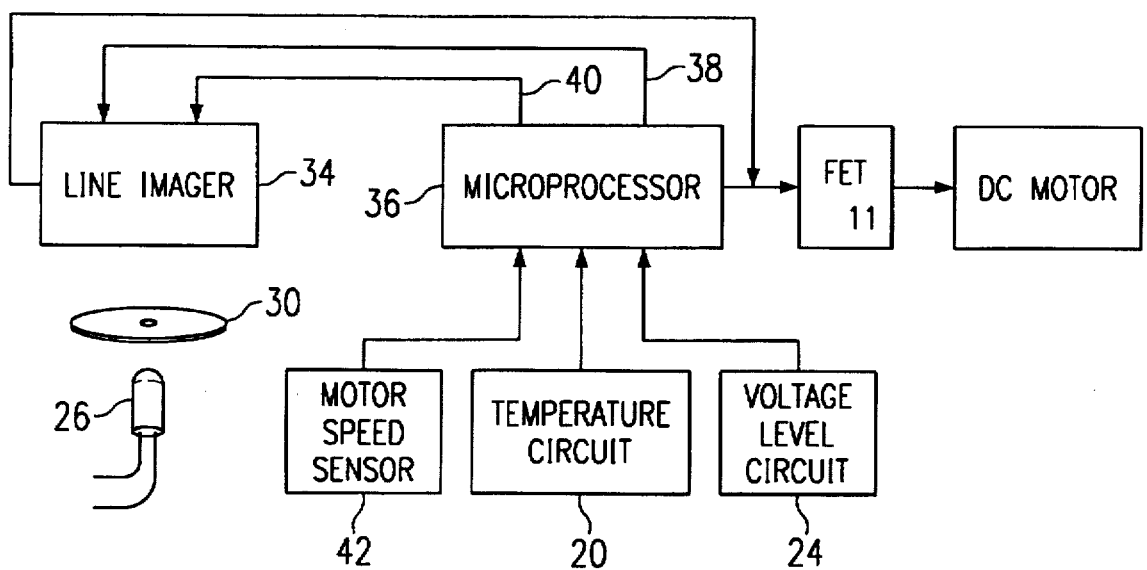
FIG. 3B is a block diagram of a second embodiment of the dc motor control circuit of the present invention.

Referring now to FIG. 3B, a block diagram of the control circuit 10 capable of utilizing the opto-electric control circuit 12 embodiments shown in FIGS. 2D and 2E is shown. The line imager 34 is connected to an array of transistors $FET_{11}$. A microprocessor 36 is connected to the line imager 34 by start increment 38 and clock 40 outputs. The microprocessor 36 is additionally connected to the transistors $FET_{11}$. The control circuit 10, further comprises a motor speed sensor 42, a temperature circuit 20 and a voltage level circuit 24, all of which have outputs received by the microprocessor 36.

In operation, the transmissive film 30 is mechanically manipulated to cause a shadow to be cast on the line imager 34 to correspond to the desired speed of the motor 16. The microprocessor 36 sends a signal on the start increment 38 output to start the line imager 34 to begin the sequential sampling of its individual pixels. The microprocessor 36 then proceeds to generate a clock signal on the clock output 40. For each pixel in the line imager 34 which is illuminated by the led 26, the transistors $FET_{11}$ are turned on which causes current to flow in the motor 16. When a given number of pixels in the line imager 34 are constantly illuminated, the transistors $FET_{11}$ excite the dc motor 16 in a constant pattern, thus causing the speed of the motor 16 to remain constant. However, if the microprocessor 36 detects that the motor speed has exceeded a preset maximum, then the microprocessor 36 causes the transistors $FET_{11}$ to shut off until the motor 16 speed has fallen below the preset maximum, and control of the transistors $FET_{11}$ is returned to the line imager 34. Similarly, if the microprocessor 36 detects that the heat of the motor 16 or the current output of the battery BAT has exceeded preset maximum values, the microprocessor 36 similarly shuts off the transistors $FET_{11}$ until the condition is no longer exceeded.

Figure 3C:
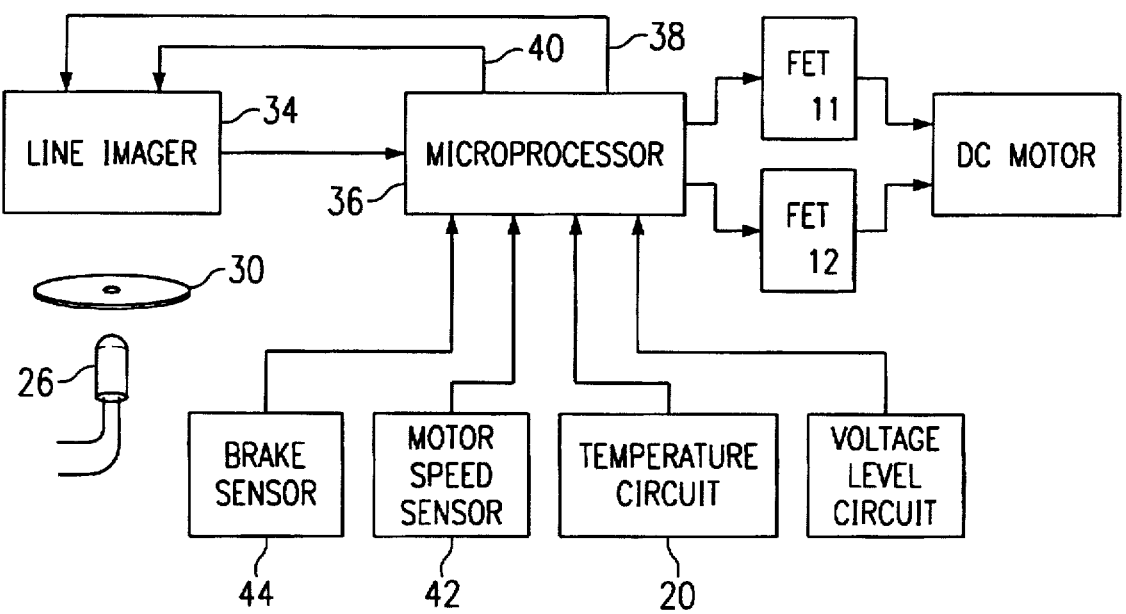
FIG. 3C is a block diagram of a third embodiment of the dc motor control circuit of the present invention.

The embodiment shown in FIG. 3C is similar to the embodiment described in connection with FIG. 3B, however, the output of the opto-electric control circuit 12 is used as an input to the microprocessor 36, and a second brake sensor 44 is used to monitor the brake in a fashion similar to the opto-electric control circuit 12 in FIG. 3B. The microprocessor 36 is connected directly to two sets of transistor arrays $FET_{11}$, for control of the motor 16.

In operation, two sets of power transistors $FET_{11}$ and $FET_{12}$ are used to control the field current and armature current, respectively of the motor 16. The microprocessor 36 monitors the opto-electric control circuit 12, the brake sensor 44, speed sensor 42, voltage level circuit 24, current level circuit 22 and temperature circuit 20 to control the transistors $FET_{11}$ and $FET_{12}$. When the microprocessor 36 detects a low motor speed and the opto-electric control circuit 12 requires maximum acceleration, the microprocessor 36 turns on both the field and armature transistors $FET_{11}$ and $FET_{12}$ to cause maximum current to flow in the field and armature of the motor 16 and maximum torque. As the speed of the dc motor 16 increases, the microprocessor 36 decreases the on time of the field transistors $FET_{11}$ to provide increased speed of the dc motor 16. If the speed of the dc motor 16 increases beyond a preset limit, such as when the dc motor 16 is used to power a vehicle and it is moving down a hill, the microprocessor 36 increases the field current in the dc motor 16 by turning on the field transistors $FET_{11}$. In this condition, the electro-motive force (EMF) of the armature will exceed the battery voltage and cause the excess kinetic energy of the dc motor 16, or vehicle, to be restored to the battery BAT. If the microprocessor 36 detects that the brake has been depressed, the microprocessor 36 similarly increases the field current by turning on the field transistors $FET_{11}$ to cause the kinetic energy to be restored to the battery BAT and to provide regenerate braking.

The present invention has several advantages. For example, the control circuit utilizes a minimal number of components while providing robust control of a dc motor. The control circuit is able to monitor a number of safety conditions, voltage, current, temperature, with minimal circuitry.

It is understood that several variations may be made in the foregoing without departing from the scope of the invention. For example, the shape and transmissivity of the film may be altered, the number of MOSFET drivers and transistors used to drive the motor 16 are variable, the values for the various resistors and capacitors may differ and different logic circuits may be utilized.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A dc motor speed control circuit comprising, a first circuit having an output, said first circuit including an opto-electric sensor for generating a first signal corresponding to a desired dc motor speed, a second circuit having an output coupled to the dc motor and an input coupled to the output of the first circuit, the second circuit receiving the first signal and generating a second signal which causes current to flow through the dc motor such that the speed of the dc motor corresponds to the desired dc motor speed of the first signal, the second circuit comprising a timer having an input, coupled to the output of the first circuit, to receive the first signal and an output, a drive circuit having an input coupled to the output of the timer and an output coupled to the dc motor, the drive circuit generating the second signal which causes current to flow through the dc motor whenever the drive circuit is turned on and a charging circuit coupled between the output of the first circuit and the input to the timer, wherein, in response to an occurrence of a selected transition in the first signal, the charging circuit is cleared and the second signal output by the timer transitions to a

9 state which turns the drive circuit off and wherein the charging circuit turns the drive circuit on by resetting the output of the timer to a next state upon expiration of a time period after the charging circuit is cleared but fails to turn the drive circuit on if a next occurrence of the selected transition occurs before the time period expires.

2. The dc motor speed control circuit of claim 1, wherein the opto-electric sensor comprises a light emitting diode, a light sensor and an interposed moveable transmissive film, whereas as the transmissive film is moved relative to the light sensor and the diode, the transmissive film permits a percentage of the light from the light emitting diode to be received by the light sensor corresponding to the position of the transmissive film.

3. The dc motor speed control circuit of claim 2, wherein the transmissive film is linear with varying transmissivity across its length.

4. The dc motor speed control circuit of claim 2, wherein the transmissive film is substantially circular with varying transmissivity around its circumference.

5. The dc motor speed control circuit of claim 2, wherein the transmissive film is substantially circular with a three-fourths oval transmissive region.

6. The dc motor speed control circuit of claim 1, wherein the opto-electric sensor comprises a light emitting diode, a line imager and an interposed moveable opaque film, whereas as the opaque film is moved relative to the line imager and the diode, the opaque film permits a percentage of the line imager to be illuminated by the light emitting diode corresponding to the position of the opaque film.

7. The dc motor speed control circuit of claim 6, wherein the opaque film is substantially linear.

8. The dc motor speed control circuit of claim 6, wherein the opaque film is substantially circular with a transmissive portion thereof to allow light from the light emitting diode to be transmitted to the line imager.

9. The dc motor speed control circuit of claim 1, further comprising a temperature circuit connected to the second circuit to measure the temperature of the drive circuit, wherein the temperature circuit causes the second signal output by the timer to transition to the state which turns the drive circuit off when a predetermined temperature of the drive circuit is exceeded.

10. The dc motor speed control circuit of claim 9, wherein the temperature circuit comprises a thermistor connected to a comparator.

11. The dc motor speed control circuit of claim 1, further comprising a voltage level circuit connected to the second circuit, wherein the voltage level causes the second signal output by the timer to transition to the state which turns the drive circuit off when a predetermined minimum voltage level is reached.

12. The dc motor speed control circuit of claim 11, wherein the voltage level circuit comprises a comparator.

13. The dc motor speed control circuit of claim 1, further comprising a current level circuit connected to the second circuit, wherein the current level circuit causes the second signal output by the timer to transition to the state which turns the drive circuit off when a predetermined maximum current level is reached.

14. The dc motor speed control circuit of claim 13, wherein the current level circuit comprises a comparator.

10

15. The dc motor speed control circuit of claim 1, wherein the second circuit comprises a microprocessor.

16. The dc motor speed control circuit of claim 1, the dc motor having separately controlled field and armature currents, wherein the second control circuit independently controls the field and armature currents.

17. A dc motor speed control circuit, comprising:

an opto-electric sensor capable of generating a first "off" signal;

a reset circuit connected to receive said first "off" signal from said opto-electric sensor, said reset circuit capable of generating an "on" signal;

a control device connected to receive said first "off" signal from said opto-electric sensor and said "on" signal from said reset circuit, said control device capable of generating an "off" signal in response to said first "off" signal from said opto-electric sensor or an "on" signal in response to said "on" signal from said reset circuit;

a drive circuit connected to receive said "off" and "on" signals from said timer, said drive circuit generating a drive signal capable of causing current to flow through a dc motor connected thereto in response to receipt of said "on" signal from said control device and not generating said drive signal in response to receipt of said "off" signal from said control device;

said reset circuit clearing in response to receipt of said first "off" signal from said opto-electric sensor and generating said "on" signal after expiration of a first time period after being cleared by said first "off" signal from said opto-electric sensor;

said first time period being reset upon receipt of a next "off" signal from said opto-electric sensor, said first "off" signal and said next "off" signal separated by a second time period;

wherein no current flows through said dc motor when said second time period is shorter than said first time period, wherein no current flows through said dc motor for only said second time period when said first time period is longer than said second time period and wherein current flows through said dc motor for a third time period, said third time period varying proportionately with said first time period while said second time period remains constant, when said first time period is longer than said second time period.

18. The dc motor speed control circuit according to claim 17 wherein said first "off" signal is a first falling edge of a square wave and said next "off" signal is a next falling edge of said square wave.

19. The dc motor speed control circuit according to claim 17 wherein said control device is a timer.

20. The dc motor speed control circuit according to claim 19 wherein said first "off" signal is a first falling edge of a square wave and said next "off" signal is a next falling edge of said square wave.

21. The dc motor speed control circuit according to claim 20 wherein said reset circuit is a charging circuit and said second time period is a recharge period for said charging circuit.

22. The dc motor according to claim 18 wherein said control device is a microprocessor.

* * * * *